(12) United States Patent
Schwartz et al.

(10) Patent No.: US 6,504,738 B2
(45) Date of Patent: Jan. 7, 2003

(54) FREEWHEELING CURRENT CONDUCTION IN WELDING POWER SUPPLY

(75) Inventors: Brian A. Schwartz, Appleton, WI (US); Albert J. DeCoster, Kaukauna, WI (US); Jon O. Reynolds, Appleton, WI (US)

(73) Assignee: Illinois Tool Works, Glenview, IL (US)

( * ) Notice: Subject to any disclaimer, the term of this patent is extended or adjusted under 35 U.S.C. 154(b) by 0 days.

(21) Appl. No.: 09/737,230

(22) Filed: Dec. 14, 2000

(65) Prior Publication Data

US 2002/0075709 A1 Jun. 20, 2002

(51) Int. Cl.[7] .......................... H02M 7/217; B23K 9/06
(52) U.S. Cl. .................................. 363/127; 219/130.33
(58) Field of Search ................................. 363/127, 131, 363/132, 97, 98; 219/130.32, 130.31, 130.1, 137 PS, 130.33, 130.51

(56) References Cited

U.S. PATENT DOCUMENTS

| | | | | |
|---|---|---|---|---|
| 3,818,177 A | * | 6/1974 | Needham et al. | 219/131 R |
| 4,247,751 A | * | 1/1981 | Ashton et al. | 219/130.31 |
| 4,392,046 A | * | 7/1983 | Tzeng | 219/130.1 |
| 5,408,067 A | * | 4/1995 | Crouse | 219/137 PS |
| 5,683,602 A | * | 11/1997 | Stava | 219/137 PS |

* cited by examiner

Primary Examiner—Rajnikant B. Patel
(74) Attorney, Agent, or Firm—Foley & Lardner

(57) ABSTRACT

A power circuit for a welding power supply includes a rectifier circuit and a control circuit. The rectifier circuit includes a plurality of switches (e.g., silicon-controlled rectifiers). The control circuit is configured to provide a first control signal to a first switch at a predetermined firing angle to provide welding power through the first switch. The control circuit is configured to provide a second control signal to a second switch to allow freewheeling current to flow through the second switch.

28 Claims, 7 Drawing Sheets

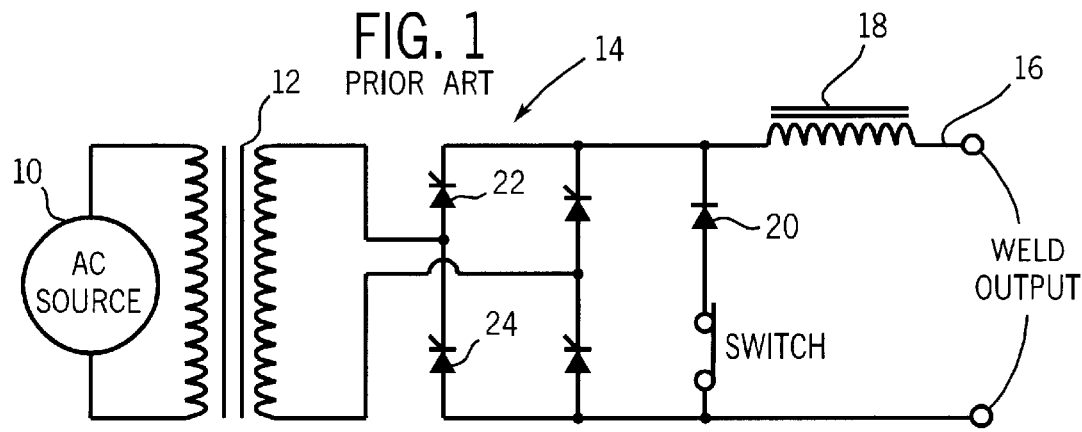
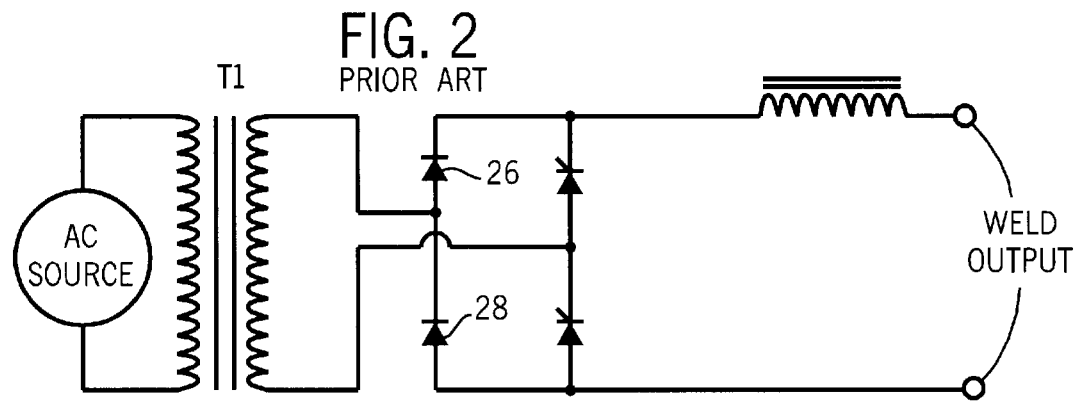
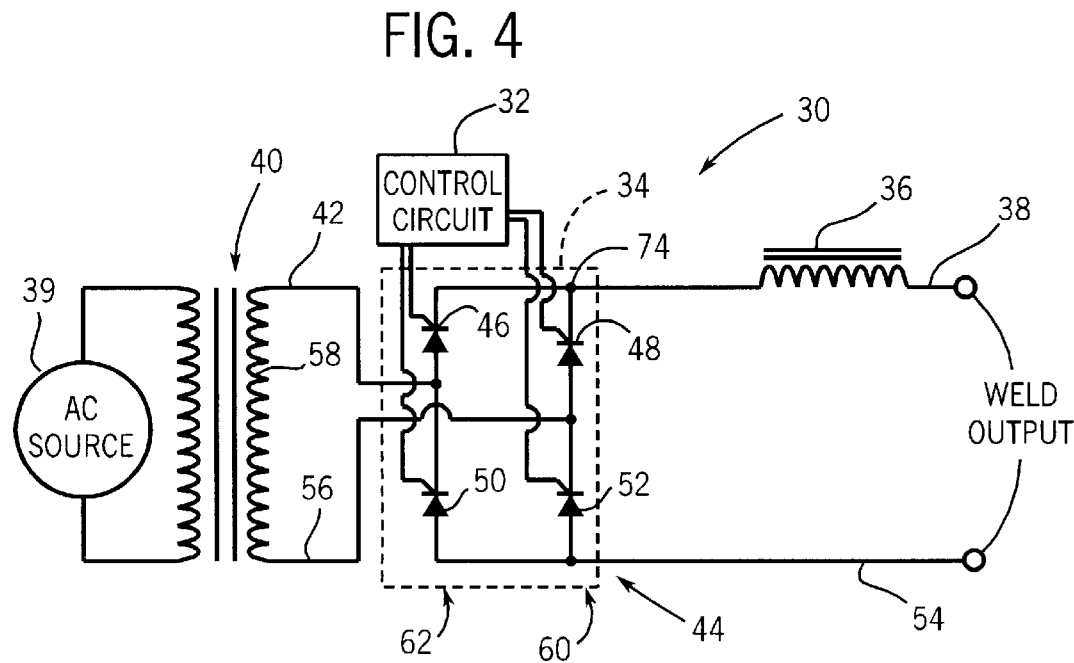

FREEWHEELING CURRENT CONDUCTION IN WELDING POWER SUPPLY

CROSS-REFERENCE TO RELATED APPLICATIONS

Not Applicable.

STATEMENT REGARDING FEDERALLY SPONSORED RESEARCH OR DEVELOPMENT

Not Applicable.

1. Field of the Invention

The present invention relates generally to welding power supplies. More specifically, the present invention relates to an improvement in the conduction of freewheeling current.

2. Background of the Invention

Welding power supplies are typically stand-alone units which receive a standard line voltage and provide a usable welding power at a welding output. The welding power may be alternating current (AC) or direct current (DC), constant current or constant voltage, three-phase or single-phase, and may include a wide range of amperages, all depending upon operator-selected inputs. Various power and control circuitry is used to shape and time the welding power based upon the operator-selected inputs.

Many welding power supplies utilize switches or gating devices, such as silicon-controlled rectifiers (SCRs), to control the amount of power provided at the welding output. An SCR is a three-terminal device which provides current from an anode to a cathode in response to a current provided to a gate when the device is forward-biased. SCRs are in wide usage in welding power supplies. A control circuit is used to drive the gate to control the SCR.

A standard topography for a power conversion circuit for a welding power supply is shown in FIG. 1. An AC source 10 provides an AC current through a transformer 12 to a bridge rectifier 14. Bridge rectifier 14, comprising four SCRs, rectifies the AC current and provides it to a welding output 16. The amount of current provided to welding output 16 depends upon the point in time at which the SCRs are turned on after becoming forward-biased (i.e., firing angle) by a control circuit (not shown). When high power is required, conduction is started early in a half-cycle of the AC current signal. When low power is required, conduction is delayed until later in the half-cycle.

A large inductor 18 is used to filter the welding current. Inductor 18 integrates the voltage pulses from the SCR bridge according to the equation: $e = L\, d_i/d_t$ to reduce the peak-to-peak output ripple current. e is voltage measured in Volts, L is inductance measured in Henries, $d_i$ is a change in current measured in Amps, and $d_t$ is a change in time measured in seconds. A freewheeling diode 20 is included to provide a conduction path for load current whenever the freewheeling path becomes forward-biased. Without this freewheeling path, the firing angle of the SCRs would be shifted forward, in order to balance the volt-seconds on inductor 18, resulting in increased peak-to-peak output ripple current and, therefore, inferior welding characteristics, particularly at low output current. Eliminating the freewheeling path also forces continuous current on the transformer secondary resulting in higher primary line current draw.

However, since freewheeling diode 20 is not used in the AC output mode, it requires a high current switch to connect it in the output circuit when DC output is used and remove it from the output circuit when AC output is used. This switch is costly and complicates the assembly process. This AC squarewave configuration is illustrated in FIG. 3. Thus, it is advantageous to construct a topography that provides the desired freewheeling function when DC output is used, and can be switched off electronically for AC output without adding diode 20 and the associated high current switch and wiring. FIG. 2 illustrates one such topography. In FIG. 2, SCRs 22 and 24 from the topography of FIG. 1 are removed and replaced with diodes 26 and 28. This circuit functions substantially the same as that of FIG. 1 without the need for a freewheeling diode because the freewheeling currents pass through diodes 26 and 28. However, when configured for an AC squarewave output, diodes 26 and 28 cannot block the freewheeling path and keep the SCR bridge in continuous conduction. Thus, the circuit of FIG. 2 cannot be used for both AC and DC operating modes.

Accordingly, there is a need for improved freewheeling current conduction in a welding power supply. Further, there is a need for a power conversion circuit for providing a welding power without the need for a freewheeling diode. Further still, there is a need for a power conversion circuit operable in both AC and DC operating modes without a freewheeling diode. Further yet, there is a need for a power conversion circuit that shares the burden of freewheeling current among several circuit components. The teachings hereinbelow extend to those embodiments which fall within the scope of the appended claims, regardless of whether they accomplish one or more of the above needs.

SUMMARY OF THE INVENTION

According to an exemplary embodiment, a power circuit for a welding power supply includes a rectifier circuit and a control circuit. The rectifier circuit includes first and second switches. The control circuit is configured to provide a first control signal to the first switch at a predetermined firing angle to provide welding power through the first switch. The control circuit is configured to provide a second control signal to the second switch to allow freewheeling current to flow through the second switch.

According to another exemplary embodiment, a method of providing welding power from an AC input and conducting current through a freewheeling path of a power circuit includes controlling a first switch with a predetermined firing angle to pass a welding power therethrough and controlling a second switch to conduct current through the freewheeling path when the freewheeling path becomes forward biased.

According to yet another exemplary embodiment, a power conversion circuit for a welding power supply includes a means for providing a welding power based on a predetermined firing angle and a means for passing freewheeling current in response to a control signal.

According to still another exemplary embodiment, a welding power supply includes a transformer, a bridge rectifier and a control circuit. The transformer is coupled to an input power source and is configured to provide an input voltage. The bridge rectifier is coupled to the transformer for receiving the input voltage. The bridge rectifier has at least four SCRs. The control circuit is configured to fire a first SCR based upon a predetermined firing angle to pass a welding power therethrough. The control circuit is configured to fire a second SCR when a freewheeling conduction path becomes forward-biased.

BRIEF DESCRIPTION OF THE DRAWINGS

The invention will become more fully understood from the following detailed description, taken in conjunction with the accompanying drawings, wherein like reference numerals refer to like parts, in which:

FIG. 1 is a schematic drawing of a power conversion circuit having a freewheeling diode and switch according to a prior art topography;

FIG. 2 is a schematic drawing of a DC-only power conversion circuit according to a prior art topography;

FIG. 4 is a schematic drawing of a power conversion circuit according to an exemplary embodiment;

DETAILED DESCRIPTION OF EXEMPLARY EMBODIMENTS

Figure 3:
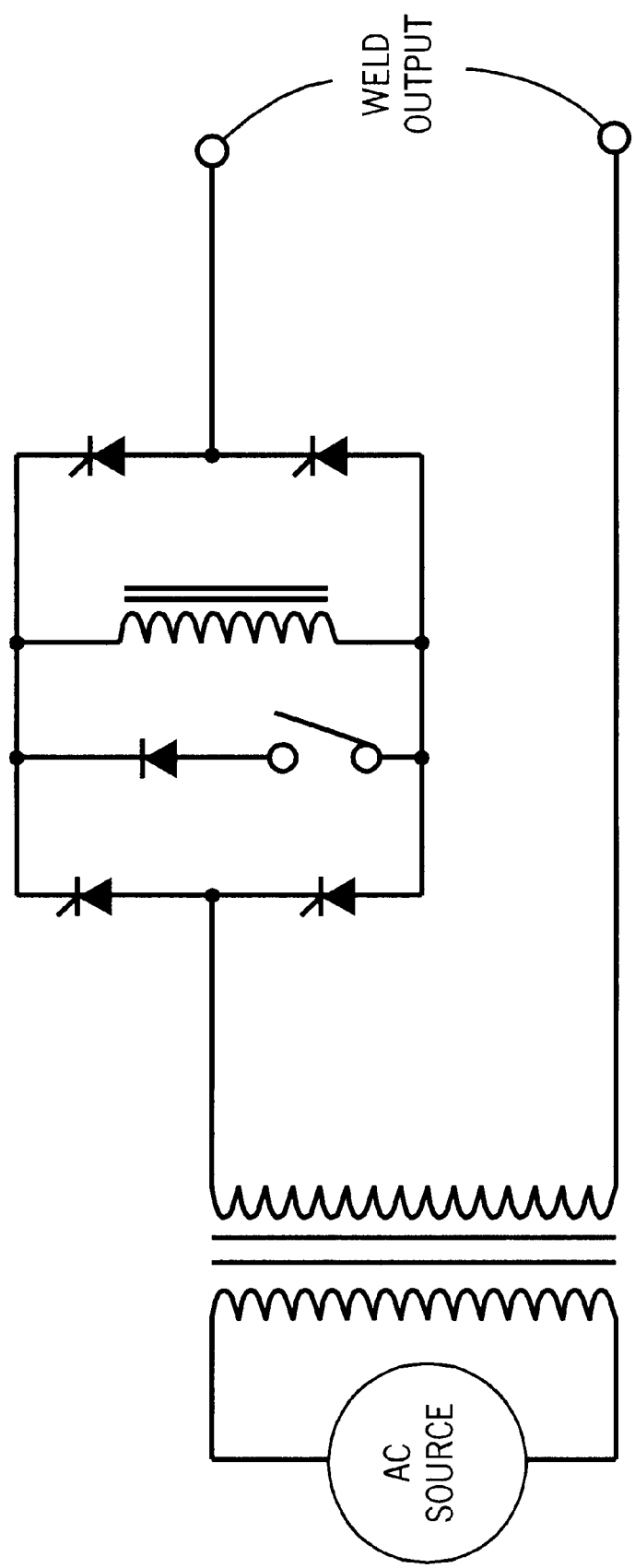
FIG. 3 is a schematic drawing of a prior art power conversion circuit configured to provide an AC output.

Referring to FIG. 4, a power circuit 30 is shown according to an exemplary embodiment. Advantageously, power circuit 30 is free of a freewheeling diode, in this exemplary embodiment. Power circuit 30 includes a control circuit 32 coupled to a rectifier circuit 34. Rectifier circuit 34 is coupled through a filter circuit 36 to a weld output 38. An AC (alternating current) source 39 provides current through a transformer 40 to rectifier circuit 34. Power circuit 30 is part of a welding power supply, which may be a DC (direct current) power supply, an AC power supply, a constant current and/or constant voltage power supply, a single-phase or three-phase power supply, the welding power supply suitable for a heavy industrial, industrial, light industrial, or other application. For example, power circuit 30 is suitable for use in a Syncrowave 350 LX power supply, manufactured by Miller Electric Mfg. Co., Appleton, Wis.

Transformer 40 steps-down a line voltage from AC source 39 to an input voltage provided on line 42. Control circuit 32 and rectifier circuit 34 are configured to control the output characteristics of welding power provided at welding power output 38, the welding power having a weld current and a weld voltage. In this exemplary embodiment, control circuit 32 includes a microprocessor, but may alternatively include a microcontroller, analog or digital control logic, programmable logic, or other control circuitry. Control circuit 32 may operate a program stored in a memory, such as, a RAM, a ROM, a magnetic storage, etc. Control circuit 32 and rectifier circuit 34 may provide an AC squarewave welding power or a DC welding power at welding output 38, depending upon the timing of control signals from control circuit 32 and the connections of the power circuit. In this exemplary embodiment, rectifier circuit 34 includes one or more switches (e.g., silicon-controlled rectifiers, transistors, diodes, or other switches). Rectifier circuit 34 includes a bridge rectifier 44 having a standard bridge topography. Specifically, switches 46 and 48 share a cathode which is coupled through filter circuit 36 (e.g., an inductor) to welding output 38. Switches 50 and 52 share an anode coupled to a reference terminal 54 of the welding output. The anode of switch 48 is coupled to the cathode of switch 52 and also to a negative input terminal 56 of a secondary coil 58 of transformer 40. The anode of switch 46 is coupled to the cathode of switch 50 and also to line 42 (e.g., a first input terminal from secondary coil 58).

In this exemplary embodiment, switches 46, 48, 50, and 52 are SCRs, each having a gate controllable by control circuit 32. Control circuit 32 selectively provides control signals to SCRs 46–52 to selectively turn SCRs 46–52 on to shape the output characteristics of welding power provided to welding output 38. Control circuit 32 may include isolation circuits (e.g., pulse transformers, opto-couplers, or other structures for isolating control circuit 32 from a power circuit or welding output) which provide electrical isolation between control circuit 32 and SCRs 46–52. Alternatively, any control circuit 32 may provide one control signal to one pulse transformer to gate each SCR, or alternatively may provide one control signal to one pulse transformer to gate a plurality of SCRs. The total number of pulse transformers can be reduced, thereby reducing cost and complexity, if multiple SCRs share a single pulse transformer. Examples of such configurations will be provided below with reference to Strategies A-C.

According to a first advantageous aspect (Strategy "A"), control circuit 32 provides control signals to switches 46 and 52 during a first half-cycle of the input power at a predetermined firing angle. A firing angle is a predetermined time at which control circuit 32 provides a control signal to a switch and is typically referred to as the phase angle of the input power at the time the switch is fired. The firing angle of the control signals provided to switches 46 and 52 is selected (e.g., by operator control or by a stored program) based upon a desired welding current to be output from switch 46 and switch 52. Thus, in response to the control signals, switches 46 and 52 provide welding power from transformer 40 to inductor 36. The welding power has a welding current and a welding voltage, the welding voltage being referenced between a terminal 38 and a terminal 54 in this exemplary embodiment. During a second half-cycle of input power, control signals having a similar phase angle are sent to switches 48 and 50.

Control circuit 32 provides additional control signals to switches 46 and 50 during both half-cycles of the input power to allow freewheeling current from filter circuit 36 to flow through switches 46 and 50. When the source voltage becomes less than the load voltage (prior to a zero-crossing of the input power), inductor 36 transitions from functioning as a series impedance to a current source. Current continues to flow through switches 46 and 52 (or 48 and 50 in the second half-cycle) even though said switches are no longer acting as the current source. Approximately at the zero crossing of the input power signal, switches 46 and 52 become reverse biased and turn off. At the same time, the freewheeling path (i.e., the path through which freewheeling current passes, shown as the path through switches 46 and 50 in this exemplary embodiment) becomes forward-biased, and switches 46 and 50 are gated at or near this time. Thus, switches 46 and 50 are gated by control signals from control circuit 32 when the freewheeling path becomes forward biased or shortly after the zero crossing of the input power.

Thus, control circuit 32 effectively uses switches 46 and 50 as diodes which conduct freewheeling current from filter circuit 36, thereby eliminating the need for a separate freewheeling diode and high current series switch. Alternatively, the roles of switches 46 and 50 can be performed by switches 48 and 52 (Strategy "B").

In this exemplary embodiment, control circuit 32 includes three pulse transformers to fire or gate switches 46–52. A first pulse transformer responds to a first control signal to fire switches 46 and 52 simultaneously during a first half-cycle to pass welding current. A second pulse transformer responds to a second control signal to fire switches 48 and 50 simultaneously during a second half-cycle to pass welding current. A third pulse transformer responds to a third control signal to fire switches 46 and 50 (in Strategy "A") or 48 and 52 (in Strategy "B") simultaneously when the freewheeling path becomes forward biased to pass freewheeling current. This embodiment reduces the number of pulse transformers needed, thereby saving cost and reducing circuit complexity and further simplifies the firing algorithm in control circuit 32. Alternatively, each pulse transformer may fire fewer or greater than two switches.

Figure 5:
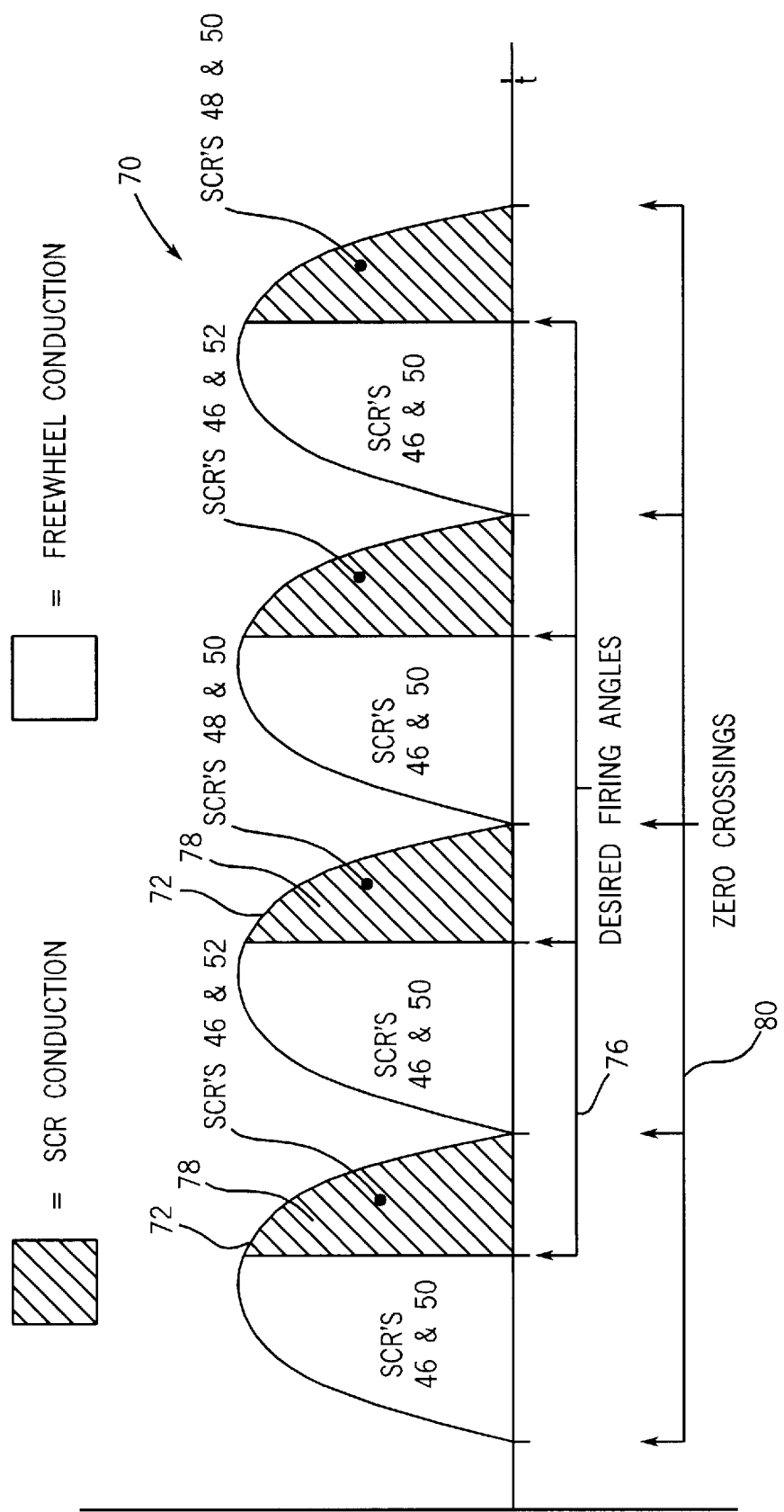
FIGS. 5, 6 and 7 are waveform plots illustrating the timing and control signals according to three exemplary switch firing strategies.
Figure 6:
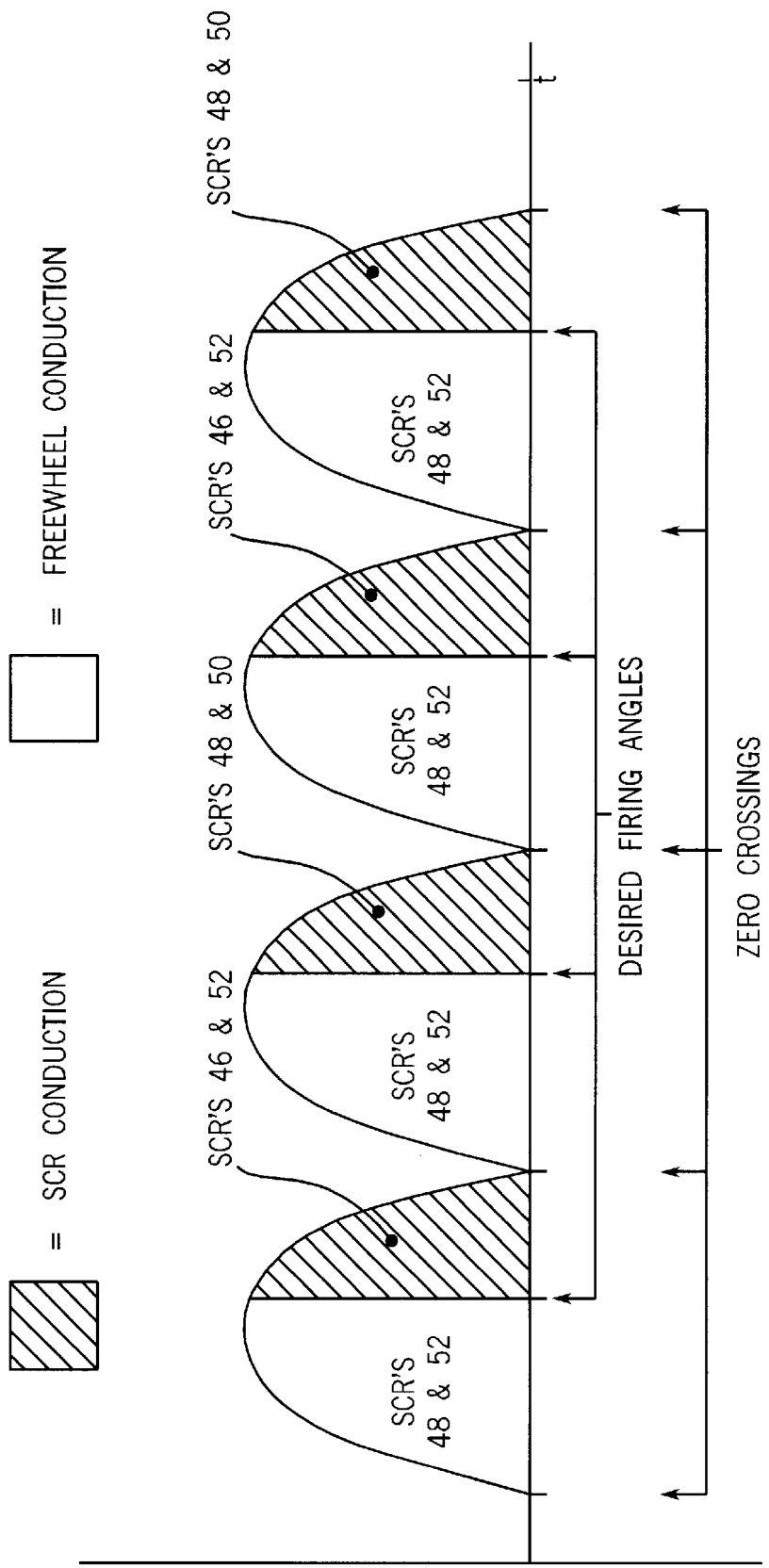

Referring now to FIG. 5, a waveform plot 70 illustrates a waveform 72 representing the welding power provided at terminal 74, which is located at the cathode of switch 48, prior to smoothing by filter circuit 36. FIG. 5 illustrates Strategy A, and FIG. 6 illustrates Strategy B. Waveform 72 is full-wave rectified by rectifier circuit 34. Times 76 illustrate the firing angles of switches 46, 48, 50, and 52 caused by the control signals applied by control circuit 32. Areas 78 indicate the resulting welding power provided at the cathode of switch 48. Times 80 correspond to zero crossings of the input power. Therefore, control circuit 32 provides control signals to switches 46 and 50 shortly after times 80 to allow switches 46 and 50 to conduct freewheeling current.

While this embodiment allows for the elimination of freewheeling diode 20, the circuit can be further optimized. One drawback of the embodiment of FIGS. 4 and 5 is that the burden of freewheeling current is excessive on switches 46 and 50, which can lead to high junction temperatures and, ultimately, device failure in some devices. One solution is to increase the current rating of the junctions for switches 46 and 50. However, this could be costly.

According to an alternative embodiment (Strategy "C", illustrated in FIG. 7), control circuit 32 may be configured to fire switches 46 and 52 during a positive half-cycle of the input power at a predetermined firing angle to provide weld current through switches 46 and 52, and to fire switches 48 and 50 during a negative half-cycle of the input power at a predetermined firing angle to pass weld current through switches 48 and 50. Control circuit 32 is further configured to fire switches 50 and 52 shortly after each zero crossing of the voltage (i.e., when the freewheeling path becomes forward biased).

In the exemplary embodiment of Strategy "C", three pulse transformers are used to fire or gate switches 46–52. A first pulse transformer responds to a first control signal to fire switches 46 and 52 simultaneously during a first half-cycle to pass welding current. A second pulse transformer responds to a second control signal to fire switches 48 and 50 simultaneously during a second half-cycle to pass welding current. A third pulse transformer responds to a third control signal to fire switches 50 and 52 simultaneously when the freewheeling path becomes forward biased to pass freewheeling current. Notably, gates 46 and 48 do not need to be fired (but may be) when the freewheeling path becomes forward biased in order to pass freewheeling current since gates 46 and 48 will remain forward biased after their respective welding current firings and, thus, will remain conductive or "ON".

Thus, freewheeling current shifts every half-cycle of the input power signal from a first branch 60 of rectifier circuit 34 to a second branch 62 of rectifier circuit 34. (First branch 60 includes switches 48 and 52; second branch 62 includes switches 46 and 50.) During one half-cycle of the input power signal, freewheeling current flows through switch 50 and switch 46, and on the subsequent half-cycle, freewheeling current flows through switch 52 and switch 48. As a result, the burden of the freewheeling current is now shared equally by all four switches 46, 48, 50, and 52, and the current ratings of switches 46–52 need not be increased.

According to another alternative embodiment, an additional set of switches may be provided in an embodiment wherein power circuit 30 is a three-phase power circuit. In this embodiment, three switches would be fired at each zero crossing instead of two.

Typically, the firing angle of a switch that provides welding power therethrough during a first half-cycle of the input power signal is the same as a second firing angle of a second switch which provides welding power therethrough during a second half-cycle of the input power signal. However, in alternative embodiments, these two firing angles may be different. Furthermore, with respect to the control signals provided at the zero crossings of the input power signal, while the switches which receive these control signals may pass the freewheeling current in circuit 30, in alternative arrangements, the freewheeling current may only flow for a portion of the normal freewheeling time.

Figure 7:
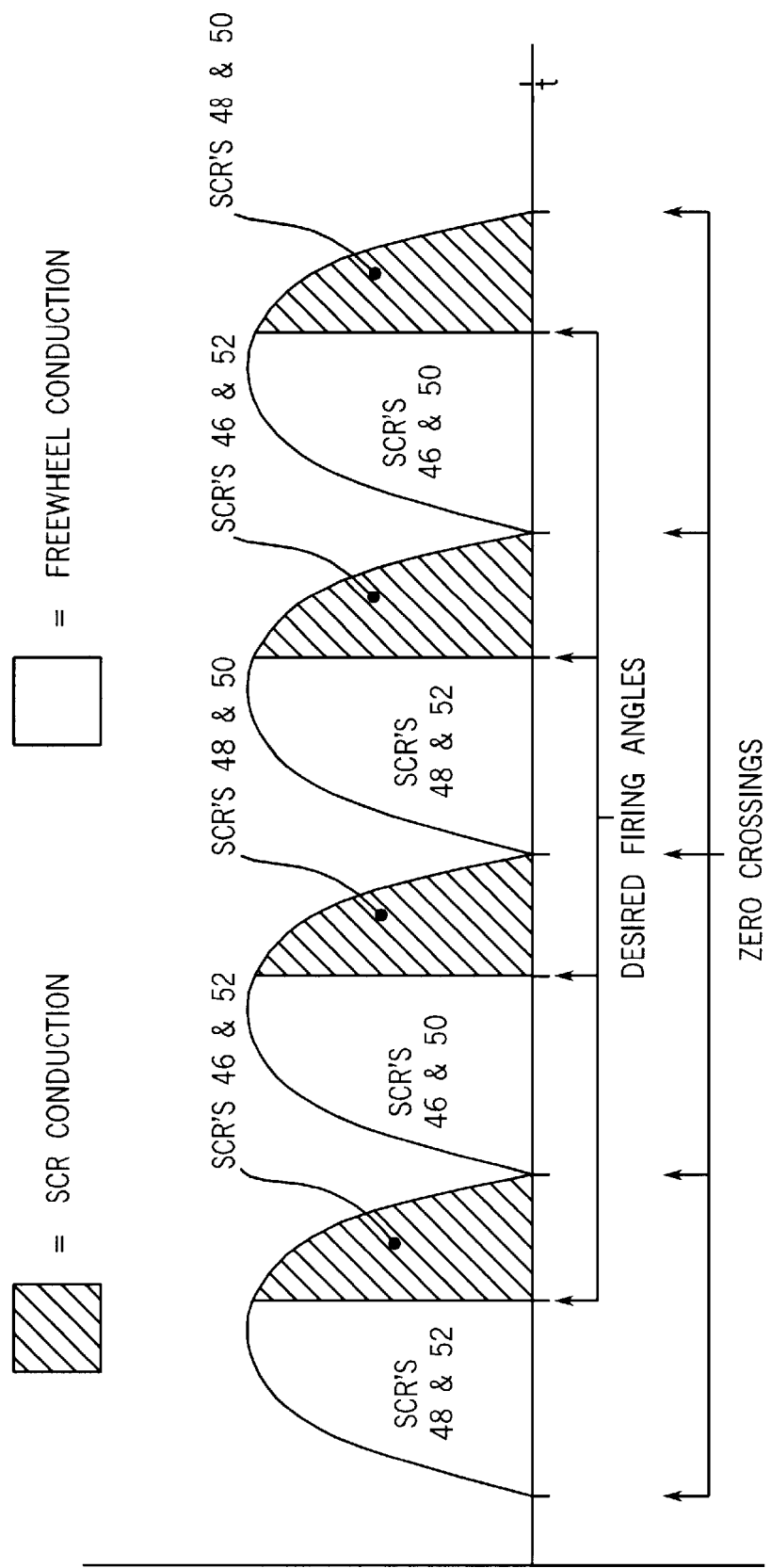
Figure 8:
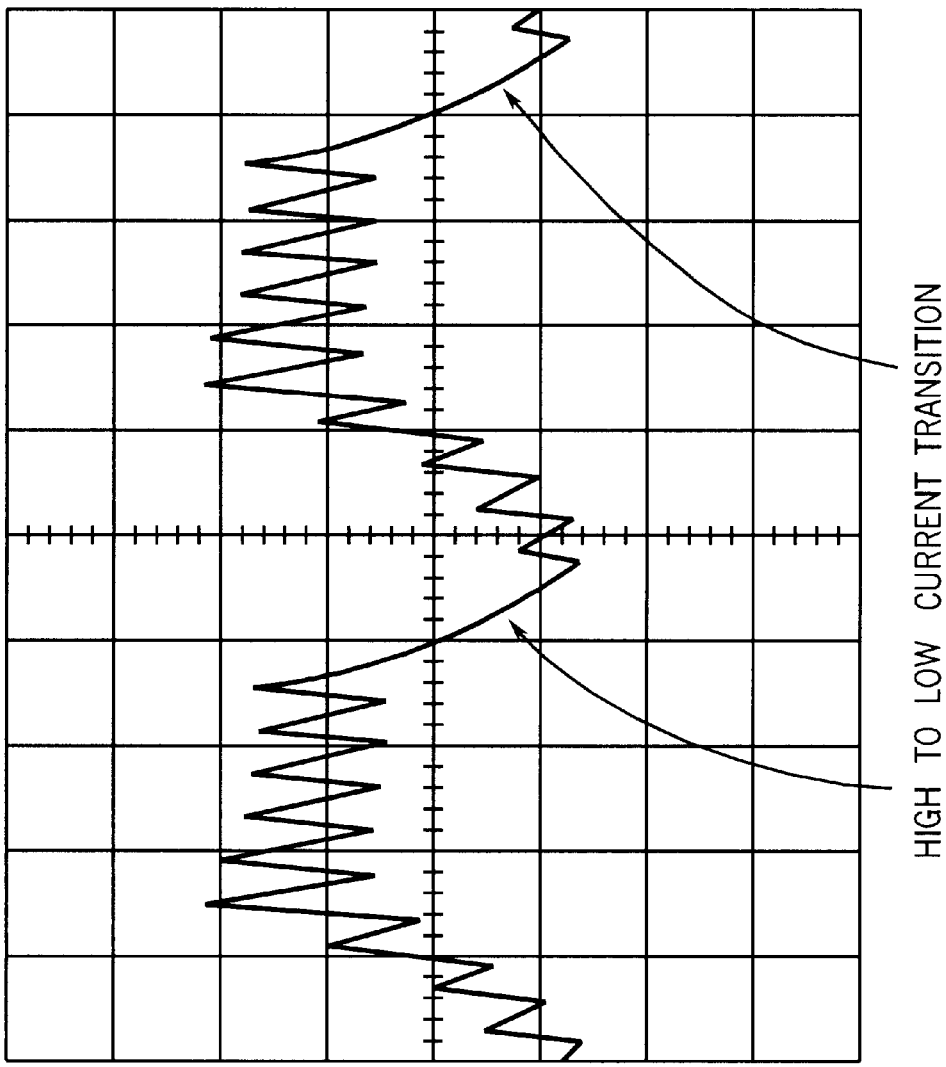
FIG. 8 is a pulsing waveform plot with the freewheeling diode in the circuit.
Figure 9:
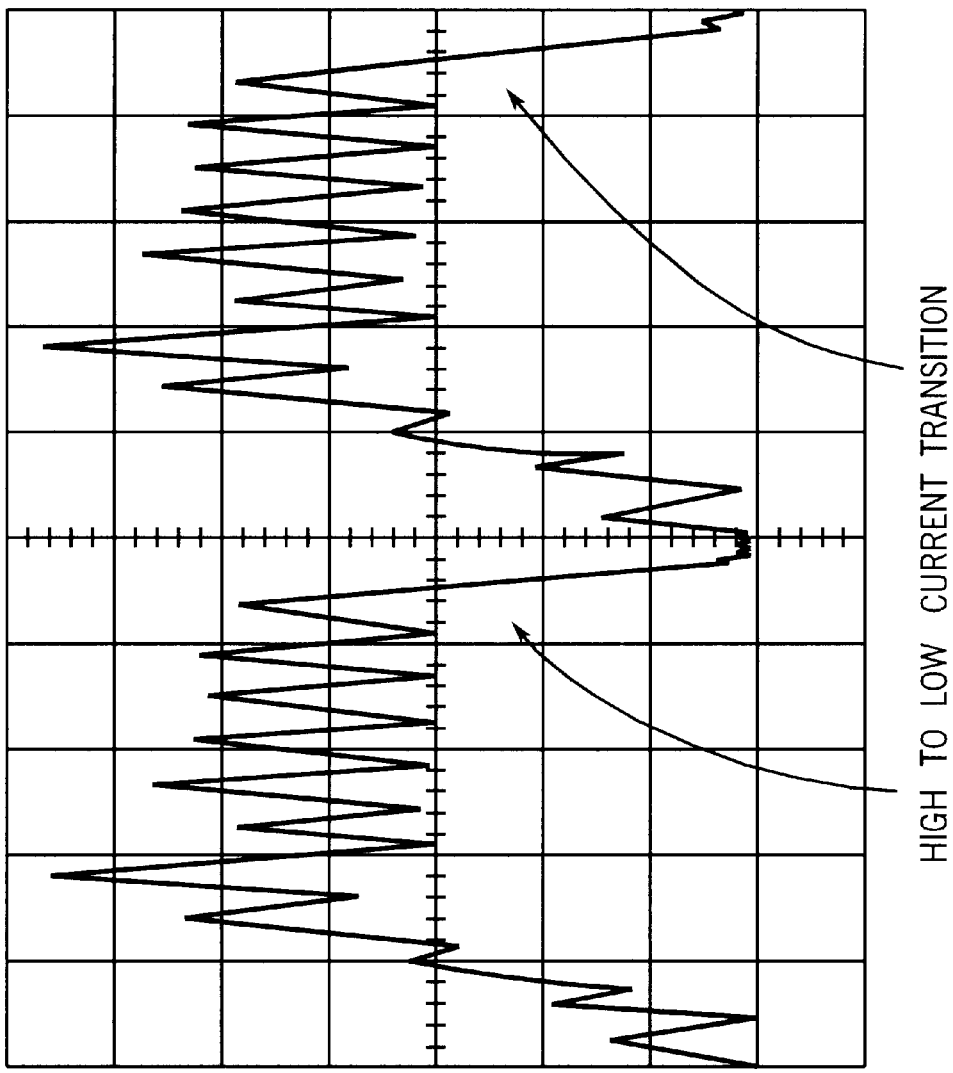
FIG. 9 is a pulsing waveform plot without the freewheeling diode in the circuit.

FIGS. 5, 6, and 7 illustrate three exemplary switch firing strategies, strategies A, B, and C, which summarize the strategies disclosed above. Additional strategies are contemplated. Advantageously, control circuit 32 may be configured for providing a DC power output using the zero crossing firing arrangement described above during a DC power operation, and may control rectifier circuit 34 to provide AC current during an AC power operation. Thus, power circuit 30 is capable of selectively providing AC or DC power based, for example, upon user input from a user input device. Such selection requires reconfiguration of the power circuit with a high current secondary switch. Further, an operator may use a user input device to adjust the desired current of a welding process, thereby causing control circuit 32 to adjust the firing angles of rectifier circuit 34 to increase or decrease based upon a desired increase in amperage or a decrease in amperage, respectively. FIGS. 8 and 9 illustrate an additional advantage of this circuit. FIG. 8 illustrates a pulsed DC welding current having a freewheeling diode and FIG. 9 illustrates a pulsed DC welding current without a freewheeling diode. According to one alternative embodiment, control circuit 32 can be manipulated to improve the pulsing capabilities of the power source by not firing the freewheel SCRs during the transition from a high current to a low current. This allows the current to decrease at a faster rate, thereby allowing higher pulsing frequencies and improved output current waveforms to be achieved.

While the exemplary embodiments illustrated in the FIGS. and described above are presently preferred, it should be understood that these embodiments are offered by way of example only. For example, various rectifier circuits may be utilized other than the specific full-wave bridge rectifier disclosed herein. Accordingly, the present invention is not limited to a particular embodiment, but extends to various modifications that nevertheless fall within the scope of the appended claims.

What is claimed is:

1. A power circuit for a welding power supply, comprising:
   a rectifier circuit having a first switch and a second switch; and
   a control circuit configured to provide a first control signal to the first switch at a predetermined firing angle to provide welding power through the first switch, wherein the control circuit is configured to provide a second control signal to the second switch to allow freewheeling current to flow through the second switch.

2. The power circuit of claim 1, wherein the control circuit is configured to provide the second control signal when a freewheeling path of the power circuit becomes forward biased.

3. The power circuit of claim 1, further comprising an inductor coupled between the first switch and a welding output, wherein the inductor generates the freewheeling current.

4. The power circuit of claim 1, wherein the first and second switches include silicon-controlled rectifiers.

5. The power circuit of claim 1, wherein the rectifier circuit includes a bridge rectifier having third and fourth switches, wherein the control circuit is configured to gate the first and third switches during a first half cycle of an input voltage to pass welding power therethrough and to gate the second and fourth switches during a second half cycle of the input voltage to pass welding power therethrough.

6. The power circuit of claim 5, wherein the first and third switches are fired simultaneously and the second and fourth switches are fired simultaneously.

7. The power circuit of claim 5, wherein the control circuit includes a first pulse transformer configured to simultaneously gate the first and third switches in response to the first control signal.

8. The power circuit of claim 5, wherein the control circuit is configured to gate the second and third switches to allow freewheeling current to flow through the second and third switches.

9. The power circuit of claim 5, wherein the control circuit is configured to gate the third and fourth switches to pass freewheeling current through the third and fourth switches, respectively, during alternating half cycles of the input power.

10. The power circuit of claim 1, wherein the welding power is DC welding power.

11. The power circuit of claim 1, wherein the control circuit and rectifier provide AC welding power during an AC power operation and DC welding power during a DC power operation.

12. A method of providing welding power from an AC input and conducting current through a freewheeling path of a power circuit, comprising:
controlling a first switch with a predetermined firing angle to pass a welding power therethrough; and
controlling a second switch to conduct current through the freewheeling path when the freewheeling path becomes forward biased.

13. The method of claim 12, further comprising controlling a third switch with the predetermined firing angle.

14. The method of claim 12, wherein the step of controlling a first switch includes providing a first control signal to a gate of a silicon-controlled rectifier and the step of controlling a second switch includes providing a second control signal to a gate of a silicon-controlled rectifier.

15. The method of claim 12, wherein the first and second switches are part of a bridge rectifier having third and fourth switches, further comprising controlling two of the switches to conduct welding power during each half cycle of the AC input and controlling two of the switches to conduct freewheeling current during each half cycle.

16. The method of claim 15, further comprising controlling the switches to share the freewheeling current equally.

17. The method of claim 15, wherein less than four pulse transformers are used to control the switches.

18. A power conversion circuit for a welding power supply, comprising:
means for providing a welding power based on a predetermined firing angle; and
means for passing freewheeling current in response to a control signal.

19. The power conversion circuit of claim 18, wherein the control signal is provided shortly after the zero crossing of an AC input power signal.

20. The power conversion circuit of claim 18, wherein the means for providing a welding power includes at least two silicon-controlled rectifiers.

21. The power conversion circuit of claim 18, wherein the means for passing freewheeling current includes at least two silicon-controlled rectifiers.

22. The power conversion circuit of claim 18, further comprising means for filtering the welding power.

23. The power conversion circuit of claim 18, further comprising means for distributing the freewheeling current equally to a plurality of silicon-controlled rectifiers.

24. The power conversion circuit of claim 18, wherein the welding power is DC welding power.

25. A welding power supply, comprising:
a transformer coupled to an input power source configured to provide an input voltage;
a bridge rectifier coupled to the transformer for receiving the input voltage, the bridge rectifier having at least four SCRs; and
a control circuit configured to fire a first SCR based upon a predetermined firing angle to pass a welding power therethrough and to fire a second SCR when a freewheeling conduction path becomes forward biased.

26. The welding power supply of claim 25, wherein the control circuit is configured to fire two of the SCRs based upon the predetermined firing angle and two of the SCRs when the freewheeling conduction path becomes forward biased.

27. The welding power supply of claim 26, wherein the control circuit includes less than four pulse transformers configured to fire the at least four SCRs.

28. The welding power supply of claim 25, wherein the control circuit is configured to distribute the freewheeling current among the four SCRs equally.

* * * * *